(12) United States Patent
Bredemeier et al.

(10) Patent No.: US 11,591,062 B2
(45) Date of Patent: Feb. 28, 2023

(54) CABIN DOOR SYSTEM FOR AN AIRCRAFT AND AN AIRCRAFT HAVING AT LEAST ONE SUCH CABIN DOOR SYSTEM

(71) Applicant: Airbus Operations GmbH, Hamburg (DE)

(72) Inventors: Kai Bredemeier, Hamburg (DE); Maik Koch, Hamburg (DE)

(73) Assignee: Airbus Operations GmbH

( * ) Notice: Subject to any disclaimer, the term of this patent is extended or adjusted under 35 U.S.C. 154(b) by 380 days.

(21) Appl. No.: 16/822,159

(22) Filed: Mar. 18, 2020

(65) Prior Publication Data

US 2020/0307758 A1 Oct. 1, 2020

(30) Foreign Application Priority Data

Mar. 27, 2019 (DE) ...................... 10 2019 107 823.7

(51) Int. Cl.
*B64C 1/14* (2006.01)
*B64D 25/14* (2006.01)
*E05B 1/00* (2006.01)

(52) U.S. Cl.
CPC ............ *B64C 1/1423* (2013.01); *B64D 25/14* (2013.01); *E05B 1/00* (2013.01); *E05B 1/003* (2013.01); *E05B 1/0038* (2013.01)

(58) Field of Classification Search
CPC ..... B64C 1/1423; B64C 1/1461; B64D 25/14; B64D 25/08
See application file for complete search history.

(56) References Cited

U.S. PATENT DOCUMENTS

| 4,125,235 A | 11/1978 | Fitzgerald et al. |
| 4,512,539 A | 4/1985 | Ackermann et al. |

(Continued)

FOREIGN PATENT DOCUMENTS

| DE | 19948844 A1 * | 4/2001 | .......... B64C 1/1407 |
| DE | 19948844 B4 | 3/2004 | |

(Continued)

OTHER PUBLICATIONS

Search Report for UK Application No. 2004197.6 dated Nov. 30, 2020; 2 pages.

(Continued)

*Primary Examiner* — Joshua J Michener
*Assistant Examiner* — Cindi M Curry
(74) *Attorney, Agent, or Firm* — Lerner, David, Littenberg, Krumholz & Mentlik, LLP

(57) ABSTRACT

An aircraft cabin door system has a cabin door having an outer side and an inner side, a drive device coupled to the cabin door for moving the cabin door into an open position, a first actuation device, a second actuation device, and an emergency chute unit coupled to the cabin door and having an emergency chute and an actuation mechanism. The emergency chute unit can be moved into an active state, in which opening the cabin door leads to activation of the emergency chute, and an inactive state, in which opening the cabin door does not lead to activation of the emergency chute. The emergency chute unit is in the inactive state when the cabin door is opened after actuation of the first actuation device. The emergency chute unit is in the active state when the cabin door is opened after actuation of the second actuation device.

13 Claims, 2 Drawing Sheets

(56) References Cited

U.S. PATENT DOCUMENTS

| | | | |
|---|---|---|---|
| 10,240,383 B2* | 3/2019 | Bessettes | E05F 15/70 |
| 2014/0009274 A1* | 1/2014 | Kohlmeier-Beckmann | ................. |
| | | | A62B 3/00 |
| | | | 340/425.5 |
| 2015/0292254 A1* | 10/2015 | Bessettes | E05F 15/70 |
| | | | 49/31 |
| 2016/0019770 A1* | 1/2016 | Bredemeier | E05C 3/165 |
| | | | 244/129.5 |
| 2016/0090196 A1* | 3/2016 | Besettes | B64C 1/1423 |
| | | | 244/129.5 |
| 2016/0107755 A1* | 4/2016 | Bessettes | B64D 25/14 |
| | | | 49/141 |
| 2016/0332716 A1* | 11/2016 | Kammerer | B64C 1/143 |
| 2021/0025212 A1* | 1/2021 | Markmiller | B64C 1/143 |

FOREIGN PATENT DOCUMENTS

| | | | | |
|---|---|---|---|---|
| EP | 2108585 | A1 | 10/2009 | |
| EP | 1719084 | B1 | 1/2011 | |
| EP | 2974963 | A1 * | 1/2016 | ........... B64C 1/1423 |
| EP | 2974963 | A1 | 1/2016 | |
| EP | 3293120 | A1 | 3/2018 | |
| WO | 2009124859 | A1 | 10/2009 | |

OTHER PUBLICATIONS

French Search Report for Application No. FR2002748 dated May 10, 2021 (p. 3 categorizing the cited art).
German Search Report for Application No. DE102019107823 dated Sep. 3, 2019 (p. 2 categorizing the cited art).

* cited by examiner

CABIN DOOR SYSTEM FOR AN AIRCRAFT AND AN AIRCRAFT HAVING AT LEAST ONE SUCH CABIN DOOR SYSTEM

FIELD OF THE INVENTION

The invention relates to a cabin door system for an aircraft and an aircraft having at least one such cabin door system.

BACKGROUND OF THE INVENTION

As a result of safety provisions, passenger aircraft have inflatable emergency chutes which are inflated in the event of an emergency when a cabin door is opened and which then extend from the corresponding door as far as the ground. At a lower side of a cabin door or under a door region, there may be provided therefor a compartment, in which the compacted emergency chute is stored. It is usually secured by a belt bar which can be coupled to the door by means of a mechanism.

An emergency chute system can be brought into an activated state and a deactivated state. In the activated state, the emergency chute is automatically blown up when the associated door is opened, whereas in a deactivated state it remains in the storage compartment. The change-over from a deactivated state into an activated state can be carried out by moving a corresponding operating lever at the inner side of the door. When the door is opened from the outer side, the emergency chute system is automatically brought into the deactivated state.

There are known cases in which the emergency chute has been triggered because it has been forgotten to move the operating lever. Damage may thereby be caused to the periphery of the aircraft. There are known different devices with which the attention of the user can be drawn to the corresponding lever in order to prevent inadvertent triggering of the emergency chute.

WO 2009124859 A1 discloses a system for preventing inadvertent activation of an emergency chute and comprises a sensor for detecting the proximity of a person in front of an aircraft door and an optical warning means which provides an optical display near an operating lever if the sensor detects the proximity of a person in front of the aircraft door.

EP 1 719 084 B1 discloses an alarm system for an aircraft door comprising a sensor for detecting whether a door handle is in the process of being gripped, by detecting a pressure on the handle or by detecting light, heat, moisture or chemical parameters which react to contact with a property of an operator's hand. An acoustic alarm is coupled to the sensor.

BRIEF SUMMARY OF THE INVENTION

An aspect of the invention proposes an alternative emergency chute system or door system which reliably prevents inadvertent inflation of the emergency chute.

There is proposed a cabin door system for an aircraft having a cabin door having an outer side and an inner side, a drive device which is coupled to the cabin door for moving the cabin door into an open position, a first actuation device which is arranged at the inner side of the cabin door, a second actuation device and an emergency chute unit which is coupled to the cabin door and which has an emergency chute and an actuation mechanism, wherein the emergency chute unit can be moved into an active state, in which opening the cabin door leads to activation of the emergency chute, and an inactive state, in which opening the cabin door does not lead to activation of the emergency chute, wherein the first actuation device is constructed to unlock and lock the cabin door, wherein the emergency chute unit is in the inactive state when the cabin door is opened after actuation of the first actuation device, and wherein the second actuation device is coupled to the drive device and is constructed to unlock the cabin door and allow it to open when the second actuation device is actuated by the drive device, wherein the emergency chute unit is in the active state when the cabin door is opened after actuation of the second actuation device.

Consequently, the cabin door can be moved from a closed position into the open position via the drive device. It may have a prior unlocking of the cabin door. The cabin door could also initially be moved into a raised position if it is necessary for it to be unlocked. However, this may be dependent on the cabin door and the locking and could be avoided in order to simplify the drive device.

The drive device may be operated mechanically, electrically, pneumatically or hydraulically. It may be advantageous to prefer particularly compact drive devices which have little weight. The second actuation device is coupled to the drive device so that, when the second actuation device is actuated, the drive device unlocks and opens the cabin door. The second actuation device could therefore allow the cabin door to open automatically, particularly in emergencies as a result of an actuation which is as simple as possible, for example, by pressing a button.

However, the first actuation device is simply constructed to unlock and to open the cabin door, wherein the emergency chute unit is then in the inactive state. This means that, during conventional opening of the cabin door, the emergency chute unit is always deactivated and, during conventional opening of the door, the inflation of an emergency chute is completely prevented. The emergency chute unit can be moved into the inactive state by different steps and at different times which will be explained below.

Furthermore, the second actuation device is coupled to the emergency chute unit in such a manner that the emergency chute unit is in the active state after the second actuation device is actuated. When the cabin door is opened by the second actuation device, consequently, the emergency chute is always inflated.

Consequently, the cabin door system according to an embodiment of the invention has the particular advantage that there are available for a user at the inner side of the cabin door two actuation devices which are used differently depending on the situation. If normal opening is desired for normal passenger traffic on the ground, the first actuation device is used, but in an emergency the second actuation device is used. By arranging the second actuation device accordingly with spacing which is as generous as possible from the first actuation device, it is possible to prevent an emergency opening from being carried out instead of a normal opening. The actuation principle of the two actuation devices could further be configured differently so that occurrences of confusion are prevented. It would also be conceivable to provide the second actuation device or a face directly beside the second actuation device with an eye-catching warning colour and/or a warning sign. The warning sign may have one or more symbols. It is further conceivable to use a written marking. A transparent covering may be used to protect the warning sign or the warning colour.

In an advantageous embodiment, the emergency chute unit is constructed to change automatically into the active state when the cabin door is closed and to change automatically into the inactive state when the first actuation device is actuated in order to open the cabin door. The first actuation device could therefore correspond to an actuation device which is arranged at an outer side of a cabin door and which is usually provided to change into the inactive state. Consequently, the drive device or the second actuation device does not have to be constructed to bring the emergency chute unit into the active state in the event of actuation.

In a further advantageous embodiment, the emergency chute unit has a coupling element, for example, a belt bar, bolts or other receiving members or locks, which can be coupled to the cabin door or a fixed aircraft structure by means of a coupling mechanism in order to change into the active state, and which can be uncoupled from the cabin door or the aircraft structure in order to change into the inactive state. The emergency chute unit could, for instance, be fitted in the cabin door so that the coupling mechanism carries out a coupling with the aircraft structure in order to switch the emergency chute sharply. Alternatively, it is also possible to fit the emergency chute unit under the cabin door in a corresponding compartment in the fuselage of the aircraft. The coupling mechanism can then achieve a coupling with the cabin door. The coupling mechanism could also further be based on an electrical coupling or a cable pull, particularly in the case of emergency chute units which are integrated in a fuselage and not in the door. The belt bar as a possible coupling element would be, for instance, a technically simple but very reliable and advantageous way of initiating a relative movement between components of the emergency chute unit during the movement of the cabin door so that this relative movement leads to actuation or ignition. An actuator or another drive could be provided in order to couple the coupling element to the cabin door or the aircraft structure or to uncouple it therefrom.

It is advantageous for the coupling mechanism to be connected directly mechanically or indirectly to the first actuation device in order to change into the inactive state when the first actuation device is actuated in order to open the cabin door. The first actuation device could consequently have a lever mechanism which is coupled to a connection member which is, however, connected to the coupling mechanism. When the first actuation device is actuated, consequently, the coupling element, for example, a belt bar, is directly uncoupled from the cabin door or the aircraft structure. Similarly, the actuation of the first actuation device for closing the cabin door may preferably result in the emergency chute unit changing into the active state.

In order to detect an actuation, the first actuation device could have at least one actuation sensor which is coupled to an actuator which is connected to the coupling mechanism, wherein the actuator is constructed to couple the coupling element via the coupling mechanism to the cabin door or the aircraft structure or to uncouple it from the cabin door or the aircraft structure. The first actuation device could, for instance, be an operating lever which has a handle at one end and which is moved about a pivot axis. The actuation sensor could, for example, be arranged on the handle. It could detect the handle being gripped or, for example, by means of an inertial sensor, detect the movement of the handle in a specific direction. However, the actuation sensor could also detect a pivot movement about the pivot axis by detecting the inertia or by an incremental encoder so that a corresponding signal is generated when a pivot movement is used. It could also be a contact sensor which establishes that a closed position of the lever has been left and a corresponding end contact has been interrupted. Naturally, additional variants are conceivable, such as contactless sensors. They could detect, for example, a hand of a user. A sensor could identify, for instance, a gripping action or already a state directly before the gripping action. Using an actuation sensor may have advantages with regard to the construction of the cabin door system because it is simply necessary to have a control or signal line from the actuation sensor to the actuator, where applicable via a control unit. A more complex rod assembly could be dispensed with. The actuator may be electrical, hydraulic, pneumatic or mechanical.

In an advantageous embodiment, the emergency chute unit is constructed to change into the active state when the first actuation device moves into a locking position. In this instance, the first actuation device could also be a door lever which can be moved by a user at the door. After complete closure of the cabin door and the ending of the movement of the first actuation device, the emergency chute unit can then be changed into the active state.

In a further advantageous embodiment, the first actuation device is connected via a rod assembly, a pulling means or a gear mechanism to the coupling mechanism. Consequently, a purely mechanical coupling of the first actuation device to the coupling mechanism is carried out. The coupling mechanism is usually in a lower region of a cabin door so that a mechanical coupling inside the cabin door is possible by the elements mentioned.

Preferably, the second actuation device has a switch, lever or push-button which is connected to the drive device in order to initiate an unlocking action and an opening movement of the cabin door. A particularly simple possibility is thereby afforded of allowing the cabin door to open by means of the drive device. No complex movement sequences of the second actuation device are necessary but instead it could be sufficient to press a push-button or switch in order to carry out an emergency opening.

The cabin door could have at least one state sensor which is coupled to the emergency chute unit in order to cause the emergency chute unit, when a closed cabin door is detected, to change into the active state. The change of states of the emergency chute unit is consequently dependent only or additionally on the state of the cabin door. It is not necessary to monitor the first actuation device.

The emergency chute unit could further be constructed to automatically change into the active state when the second actuation device is actuated. When the second actuation device is actuated, therefore, a plurality of movement sequences are combined with each other. After actuation, initially the change into the active state is carried out, as already set out above. The drive device can then move the cabin door into the open position. In this case, the emergency chute is actuated and consequently inflated.

In a preferred embodiment, the second actuation device can be coupled to the actuator in order to cause the actuator, when the second actuation device is actuated, to couple the coupling element to the cabin door or the aircraft structure. The coupling of the belt bar to the cabin door and therefore the change into the active state are then carried out directly after actuation of the second actuation device.

The invention further relates to an aircraft having an aircraft fuselage and at least one cabin door system according to the preceding description. Naturally, the aircraft may have a plurality of cabin door systems, depending on the size of the aircraft.

The second actuation device is arranged on the inner side of the cabin door or beside the cabin door. It could be advantageous to arrange the second actuation device so as to be readily reachable and clearly visible and to associate it directly with the door as a result of proximity to the door.

Furthermore, the second actuation device could have a warning colour and/or an illuminated marking. As a result, the attention of the user is drawn to the second actuation device.

It is further advantageous to provide the cabin door system according to the invention with a control unit which controls the drive device. The control unit could be coupled to a superordinate system of the aircraft in order, for example, to receive a flight status of the aircraft. The control unit is then preferably constructed to activate the drive device only when the aircraft is on the ground.

BRIEF DESCRIPTION OF THE DRAWINGS

Additional features, advantages and possible applications of the present invention will be appreciated from the following description of the embodiments and the Figures. In this instance, all the features described and/or graphically depicted constitute per se and in any combination the subject-matter of the invention, including independently of the composition thereof in the individual claims or the back-references thereof. In the Figures, the same reference numerals continue to stand for the same or similar objects.

DETAILED DESCRIPTION

Figure 1:
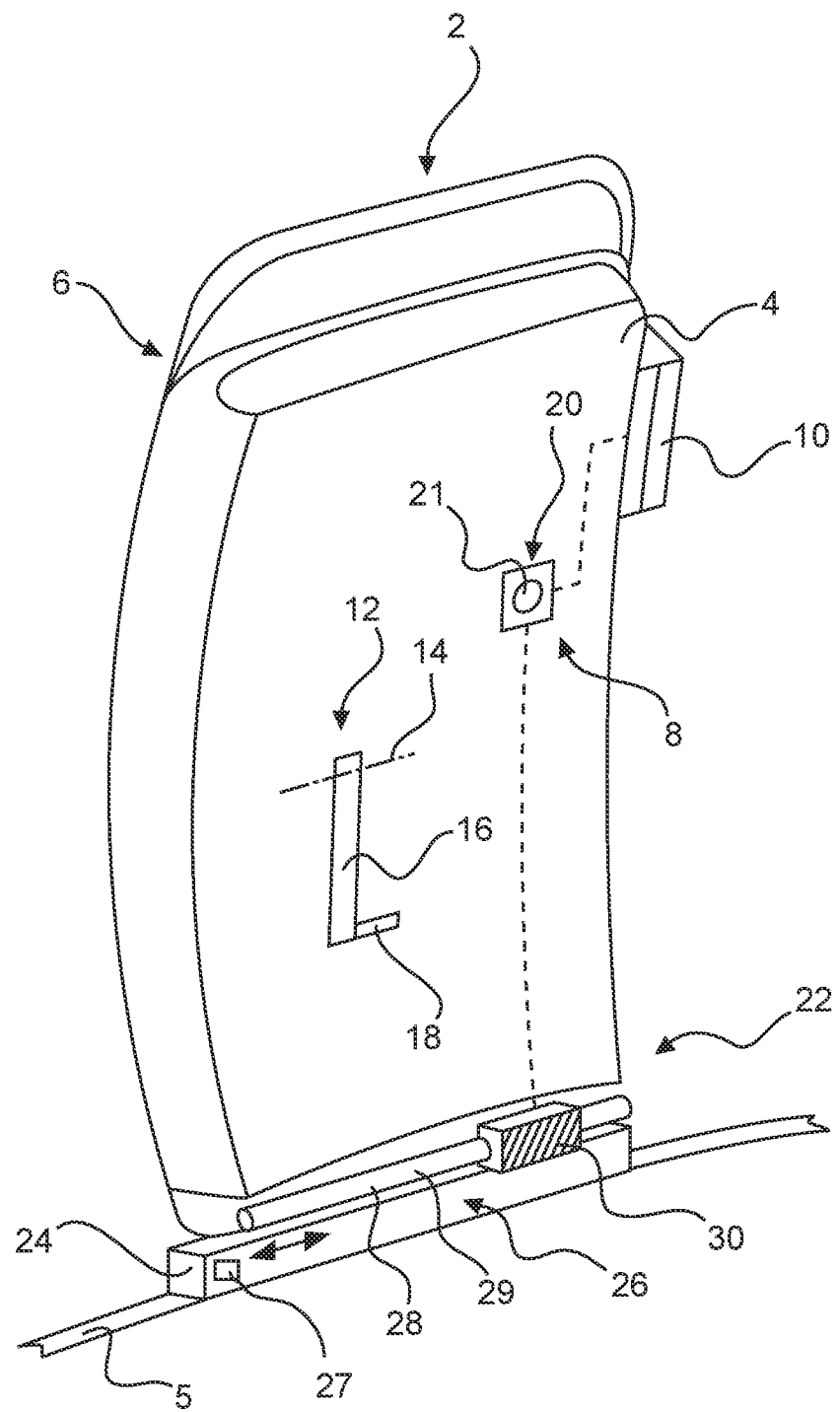
FIG. 1 is a three-dimensional illustration of a first embodiment of a cabin door system.

FIG. 1 shows a cabin door system 2 which has a cabin door 4 having an outer side 6 and an inner side 8. Furthermore, a drive device 10 which is only highly schematic in this depiction is provided. It may be advantageous to use completely different drive devices which are dependent on the construction of the cabin door 4 and which are capable of moving the cabin door 4 into an open position. The illustration in FIG. 1 is accordingly not intended to be understood to be a limitation of dimensions, the installation location or other details.

A first actuation device 12 is schematically illustrated at the inner side 8 and has an operating lever 16 which can be pivoted about a pivot axis 14 and which has a handle 18 which is spaced apart from the pivot axis 14. This illustration is also intended to be understood to be exemplary and not to be understood to be a limitation of the subject-matter to such a first actuation device 12. In order to open the door 4, a user can grip the handle 18 and can pivot the operating lever 16 upwards about the pivot axis 14 so that the door 4 is unlocked and can subsequently be pivoted open. This could be carried out with the support of the drive device 10 or manually. In addition to the first actuation device, it is conceivable to arrange an additional handle (not shown) with which it is made easier for the user to move the cabin door 4.

Furthermore, there is provided a second actuation device 20 which is arranged with spacing from the first actuation device 12. By way of example, it has a push-button 21 which is pressed by a user. The second actuation device 20 is coupled to the drive device 10. There is provision for the drive device 10 to open the cabin door 4 when the second actuation device 20 is actuated.

An emergency chute unit 24 which has an emergency chute 26 is arranged at a lower side 22 of the cabin door 4. The emergency chute unit 24 can be changed into an active state, in which the cabin door 4 being opened leads to actuation of the emergency chute 26. In an inactive state, the emergency chute 26 is not actuated by the cabin door 4 being opened. The active state and inactive state can be achieved, for example, by a belt bar mechanism as a coupling mechanism 28 which has a belt bar 29 as the coupling element which can be coupled to an aircraft structure 5 or uncoupled therefrom in this case by way of example via an actuator 30. In a coupled state, which corresponds to the active state, the cabin door 4 brings about a relative movement between components of the emergency chute 26 by means of the coupling mechanism 28, which results in actuation. In an inactive state, the coupling mechanism 28 is not coupled to the aircraft structure 5 so that the door 4 can be opened without the emergency chute 26 being actuated. In an embodiment, the cabin door has at least one sensor 27 which is coupled to the emergency chute unit in order to cause the emergency chute unit, when a closed cabin door is detected, to change into the active state.

At this point, it may be noted that the emergency chute unit 24 can be installed in the cabin door 4 so that the coupling mechanism 28 carries out a coupling with the aircraft structure 5 in order to carry out the actuation of the emergency chute. If the emergency chute unit 24 is fitted under the cabin door 4, however, the coupling mechanism 28 can achieve coupling with the cabin door 4. The coupling mechanism 28 could further also be based on an electrical coupling or a cable pull, in particular in emergency chute units 24 which are not integrated in the door 4 but instead in a fuselage.

There is provision in the cabin door system 2 according to an embodiment of the invention for the emergency chute unit 24 always to be in the inactive state, when the cabin door 4 is opened by means of the first actuation device 12, and for the emergency chute unit 24 always to be in the active state when the second actuation device 20 is actuated.

In the variant in FIG. 1, for instance, the second actuation device 20 could be coupled to the actuator 30 so that, when it is actuated, the coupling mechanism which is configured as a belt bar mechanism 28 is coupled to the aircraft structure 5 before the drive device 10 finally opens the door 4. When the first actuation device 12 is actuated, the belt bar mechanism 28 remains uncoupled from the aircraft structure 5 so that the emergency chute 26 is not actuated. Other variants are shown in the following Figures.

Figure 2A:
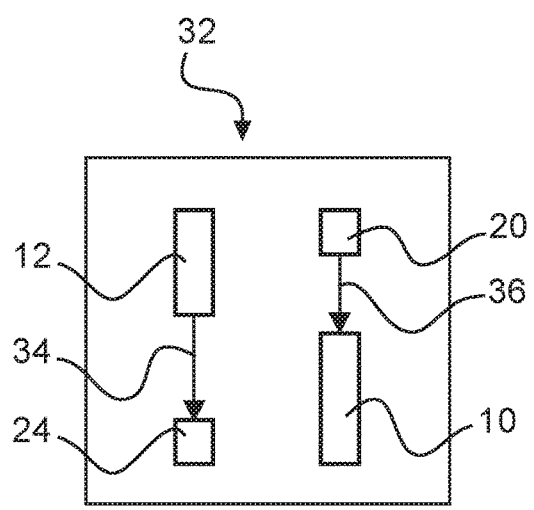
FIGS. 2a to 2c schematically show additional embodiments.

FIG. 2a is a highly simplified, schematic illustration of a variant of a cabin door system 32. In this case, the first actuation device 12 is coupled to the emergency chute unit 24 so that, when the first actuation device 12 is actuated, the emergency chute unit 24 is automatically changed into the inactive state. This could be carried out by a mechanical device 34 which could be connected to the coupling mechanism 28. Similarly, the second actuation device 20 is coupled via an electrical connection 36 to the drive device 10.

Figure 2B:
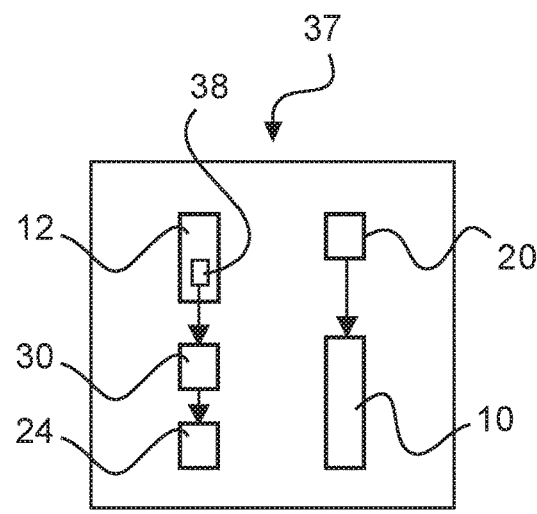

FIG. 2b shows an additional cabin door system 37 in which the first actuation device 12 has an actuation sensor 38 which is coupled to the actuator 30 which is coupled to the emergency chute unit 24 via the coupling mechanism 28. When the first actuation device 12 is moved, the actuation sensor 38 can detect the actuation in order to then move the emergency chute unit 24 into the inactive state via the actuator 30. The second actuation device 20 can, as in the preceding embodiment, be coupled to the drive device 10.

Figure 2C:
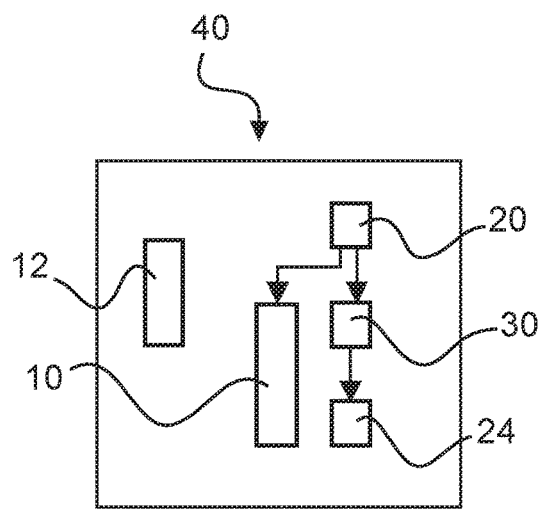

FIG. 2c shows a cabin door system 40, in which the second actuation device 20 is coupled to the emergency chute unit 24 so that, when the second actuation device 20 is actuated, the emergency chute unit 24 is automatically moved into the active state. This is particularly carried out by coupling the second actuation device 20 to the actuator 30 and simultaneous or subsequent initiation of a movement by means of the drive device 10. The first actuation device 12 consequently does not have any coupling to the emergency chute unit 24.

Figure 3:
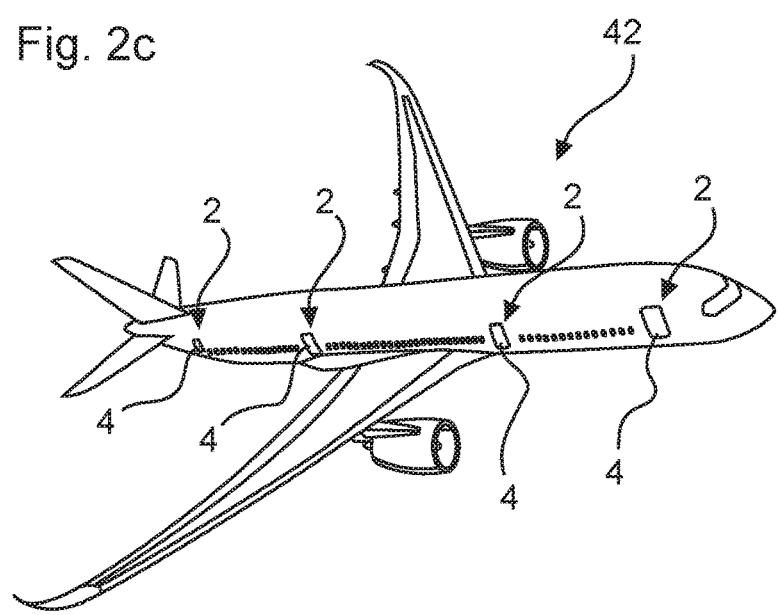
FIG. 3 shows an aircraft having a plurality of cabin door systems.

Finally, FIG. 3 shows an aircraft 42 which has a plurality of cabin door systems 2. Naturally, other variants, for example, the embodiments of the cabin door systems 32, 37 and 40, can be integrated.

It should be additionally noted that the term "having" does not exclude any other elements or steps and "a" or "an" does not exclude a large number. Furthermore, it should be noted that features which have been described with reference to one of the above embodiments can also be used in combination with other features of other above-described embodiments. Reference numerals in the claims are not intended to be considered to be a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS

2 Cabin door system
4 Cabin door/door
5 Aircraft structure
6 Outer side
8 Inner side
10 Drive device
12 First actuation device
14 Pivot axis
16 Operating lever
18 Handle
20 Second actuation device
21 Push-button
22 Lower side
24 Emergency chute unit
26 Emergency chute
28 Belt bar mechanism/Coupling mechanism
29 Belt bar/coupling element
30 Actuator
32 Cabin door system
34 Mechanical device
36 Electrical connection
37 Cabin door system
38 Actuation sensor
40 Cabin door system
42 Aircraft

The invention claimed is:

1. A cabin door system for an aircraft comprising:
a cabin door having an outer side and an inner side;
a drive device coupled to the cabin door and configured for moving the cabin door into an open position;
a first actuation device arranged at the inner side of the cabin door, wherein the first actuation device is configured to unlock and lock the cabin door and to allow the cabin door to open when the first actuation device is actuated by a user;
a second actuation device coupled to the drive device and configured to unlock the cabin door and to allow the cabin door to open when the second actuation device is actuated by the user, the drive device configured to open the cabin door when the second actuation device is actuated; and
an emergency chute unit coupled to the cabin door and comprising an emergency chute and an actuator,
wherein the emergency chute unit is configured to be moved into an active state, in which opening the cabin door leads to activation of the emergency chute, and an inactive state, in which opening the cabin door does not lead to activation of the emergency chute,
wherein the emergency chute unit is in the inactive state when the cabin door is opened after actuation of the first actuation device, and
wherein the emergency chute unit is in the active state when the cabin door is opened after actuation of the second actuation device.

2. The cabin door system according to claim 1, wherein the emergency chute unit is configured to change automatically into the active state when the cabin door is closed and to change automatically into the inactive state when the first actuation device is actuated in order to open the cabin door.

3. The cabin door system according to claim 1, wherein the emergency chute unit further comprises a coupling element configured to be coupled to the cabin door or a fixed aircraft structure in order to change into the active state, and configured to be uncoupled from the cabin door or the aircraft structure in order to change into the inactive state.

4. The cabin door system according to claim 2, wherein the emergency chute unit further comprises a coupling element configured to be coupled to the cabin door or a fixed aircraft structure in order to change into the active state, and configured to be uncoupled from the cabin door or the aircraft structure in order to change into the inactive state, and
wherein the coupling mechanism is connected directly mechanically or indirectly to the first actuation device in order to change into the inactive state when the first actuation device is actuated in order to open the cabin door.

5. The cabin door system according to claim 4,
wherein the first actuation device comprises, in order to detect an actuation, at least one actuation sensor coupled to an actuator connected to the coupling element, and
wherein the actuator is constructed to couple the coupling element to the cabin door or the aircraft structure or to uncouple the coupling element from the cabin door or the aircraft structure.

6. The cabin door system according to claim 2, wherein the emergency chute unit is configured to change into the active state when the first actuation device moves into a locking position.

7. The cabin door system according to claim 1, wherein the second actuation device comprises a switch, lever or push-button connected to the drive device in order to initiate an unlocking action and an opening movement of the cabin door.

8. The cabin door system according to claim 2, wherein the cabin door comprises at least one sensor coupled to the emergency chute unit,
   wherein, when a closed cabin door is detected by the at least one sensor, the emergency chute unit is configured to change into the active state.

9. The cabin door system according to claim 1, wherein the emergency chute unit is configured to automatically change into the active state when the second actuation device is actuated.

10. The cabin door system according to claim 5, wherein the emergency chute unit is configured to automatically change into the active state when the second actuation device is actuated, and
   wherein the second actuation device is coupled to the actuator and the actuator is configured, when the second actuation device is actuated, to couple the coupling element to the cabin door or the aircraft structure.

11. An aircraft comprising:
   an aircraft fuselage; and
   at least one cabin door system according to claim 1.

12. The aircraft according to claim 11, wherein the second actuation device is arranged on the inner side of the cabin door or beside the cabin door.

13. The aircraft according to claim 11, wherein the second actuation device has a warning colour and/or an illuminated marking.

* * * * *